(No Model.)

R. P. METZ.
COVER FOR COMMODES OR OTHER PAILS.

No. 459,253. Patented Sept. 8, 1891.

Witnesses:
Hamilton D. Turner
A. V. Groupe

Inventor
Robert P. Metz
by his Attorneys
Howson & Howson

UNITED STATES PATENT OFFICE.

ROBERT P. METZ, OF PHILADELPHIA, PENNSYLVANIA.

COVER FOR COMMODES OR OTHER PAILS.

SPECIFICATION forming part of Letters Patent No. 459,253, dated September 8, 1891.

Application filed April 30, 1891. Serial No. 391,061. (No model.)

*To all whom it may concern:*

Be it known that I, ROBERT P. METZ, a citizen of the United States, and a resident of Philadelphia, Pennsylvania, have invented certain Improvements in Covers for Commodes or other Pails, of which the following is a specification.

The object of my invention is to so construct a combined lid and lifter for commodes or other articles that the device can be readily applied or removed, as clearly described hereinafter, reference being had to the accompanying drawings, in which—

Figure 1:
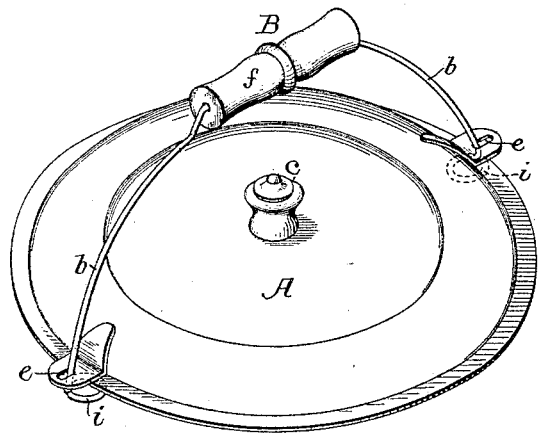
Figure 2:
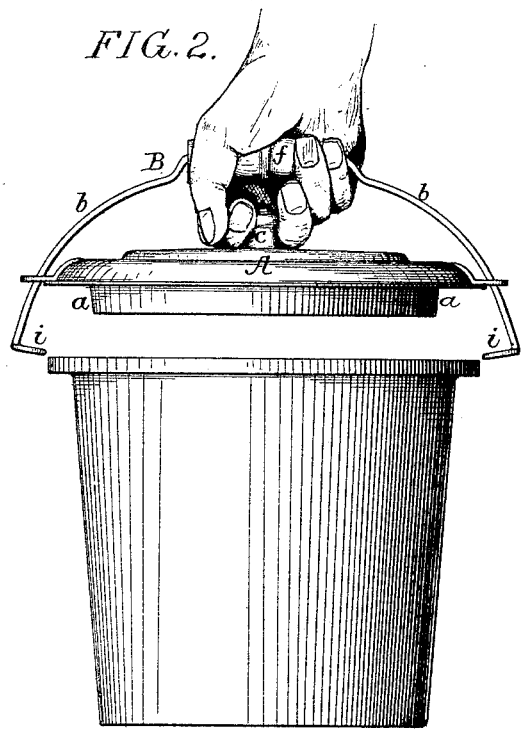
Figure 3:
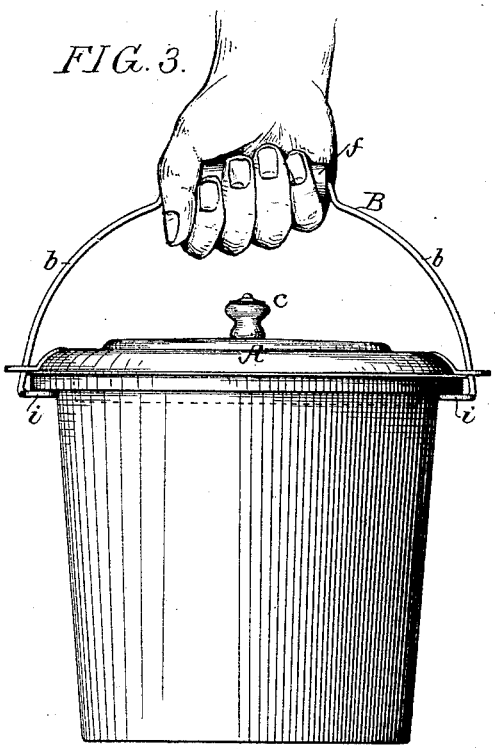

Figure 1 is a perspective view of my combined lid and lifter. Fig. 2 is a side view showing the device ready to be applied to an article. Fig. 3 is a side view showing the device applied to the article.

A is the lid, having, preferably, a flange $a$, which passes into the commode, preventing the lid from sliding when once adjusted. The lid is provided with a suitable knob $c$, which can be grasped by the hand.

B is the bail, having converging arms $b\ b$, which pass through guides $e\ e$ on the lid A, these guides being in the present instance in the form of perforated ears, the arms having their ends in the present instance turned in, forming grasping-fingers $i\ i$, which may be of any shape desired, depending to a great extent upon the article to which the lifter is applied. The bail is provided with a suitable handle $f$, by which the article is carried.

In handling such articles as commodes it is desirable to cover them when carrying, and I have so combined the lid with the bail that by drawing the two together the bail will expand to such an extent as to pass freely over the rim of the commode, after which by releasing the lid the bail will grasp the flange of the commode and the lid will cover it. The commode can then be carried from one place to another by the bail, which can be readily released by pressing it down upon the lid, thus forcing its ends away from the flange, after which the bail and lid can be readily removed from the commode.

It will be understood that my invention can be applied to any articles which require covers and carrying-bails.

I claim as my invention—

1. The combination of the detachable bail having converging arms provided with lugs at their lower free ends for engaging the article to be lifted, with a cover for the article, said cover being mounted on and controlling the lateral movement of the arms, substantially as and for the purpose described.

2. The combination of the cover, a flange thereon, a handle therefor, guides on said cover, with a bail having a handle and converging arms, the said arms passing through the guides on the cover, and lips on the free ends of the arms for engaging the article to be lifted, the whole arranged substantially as and for the purpose described.

In testimony whereof I have signed my name to this specification in the presence of two subscribing witnesses.

ROBERT P. METZ.

Witnesses:
  JNO. E. PARKER,
  HARRY SMITH.